United States Patent [19]

Meyer

[11] Patent Number: 4,511,104

[45] Date of Patent: Apr. 16, 1985

[54] TABLE-LIKE SUPPORT INSTALLATION FOR PAPERS, ESPECIALLY AT A COVERING FRAME OF A SLIDING WINDOW

[75] Inventor: Juergen Meyer, Vaihingen/Enz, Fed. Rep. of Germany

[73] Assignee: Dr. Ing. h.c.F. Porsche AG, Fed. Rep. of Germany

[21] Appl. No.: 474,515

[22] Filed: Mar. 11, 1983

[30] Foreign Application Priority Data

Mar. 16, 1982 [DE] Fed. Rep. of Germany ....... 3209408

[51] Int. Cl.³ .............................................. B64D 11/00
[52] U.S. Cl. .............................. 244/118.5; 244/129.3; 248/460; 248/441.1
[58] Field of Search ............... 244/118.5, 129.1, 129.3, 244/1 R; 248/441 B, 441 C, 460; 108/44, 77, 134

[56] References Cited

U.S. PATENT DOCUMENTS

| 687,031 | 11/1901 | Jeffcott | 108/134 |
| 1,890,526 | 12/1932 | McEwing | 108/134 |
| 2,050,951 | 8/1936 | Hundertmark | 108/44 |

FOREIGN PATENT DOCUMENTS 463360 4/1951 Italy .................................. 108/134

Primary Examiner—Trygve M. Blix
Assistant Examiner—Rodney Corl
Attorney, Agent, or Firm—Craig & Burns

[57] ABSTRACT

A table-like support installation for papers and the like is mounted to a covering frame of a sliding window. In order for the support installation to be arranged on the covering frame in a non-disturbing manner, two support elements are included, of which one support element is fixed to a first frame section and the other support element is movable from a rest or recessed position into an operating or extended position. Movement from the operating or extended position to the rest or recessed position of the movable support element is accomplished by the manual release of a latching mechanism or automatically when the sliding window is moved toward an open position.

18 Claims, 4 Drawing Figures

TABLE-LIKE SUPPORT INSTALLATION FOR PAPERS, ESPECIALLY AT A COVERING FRAME OF A SLIDING WINDOW

The present invention relates to a support installation for papers, especially at a covering frame of a sliding window of an aircraft cockpit. the sliding window frame includes a first frame section extending approximately perpendicularly to the window and is adjoined by a second frame section extending approximately at a right angle thereto. The support installation is provided at the first frame section and includes a portion shiftable into the proximity of the second frame section.

In a known table-like support installation of the aforementioned type, a part of the support installation projects over a frame section of the covering frame extending perpendicularly to the support plane. This prior art construction entails the disadvantage that the overhanging part is not only prone to cause injuries but also abuts at adjacent structural parts (seat) during longitudinal movements of the sliding window.

It is therefore the primary object of the present invention to provide a support installation which, on the one hand, offers a relatively large table-like support surface and which, on the other, is so constructed that the injury risk is reduced thereby. However, it is also to be assured by the present invention that during the movement (opening) of the sliding window, the support installation offers no obstacle to such movement.

The underlying problems are solved according to the present invention in that the support installation includes at least two support elements, of which a first support element is fixedly mounted at the first frame section and the other support element is adapted to be moved from a rest or stored position extending along the second frame section into an extended or operating position, in which the movable support element forms an extension of the fixed support element and is retained in position by means of a latching mechanism.

The advantages principally achieved with the present invention reside in that the support installation offers, in the extended or operating position of the movable support element, a large table-like support surface for papers such as, for example, maps. If, in contrast thereto, the movable support element is in its rest or stored position, then the entire support installation is integrated into the covering frame and forms a non-disturbing structural part not prone to cause injuries, which, during the movement of the sliding window, can be guided past a seat without any problem. The movable support element cooperates with a spring which assures that it remains in its rest or stored position and that it is returned automatically from the extended or operating position into the rest or stored position after the unlatching of a latching mechanism. The unlocking of the latching mechanism can be realized easily by means of an actuating member which includes a recessed pushbutton. By reason of the fact that the unlocking takes place also during the opening movement of the sliding window—the movable support element is thereafter in its rest or stored position—no additional manipulations are required prior to the actuation of the sliding window.

It is achieved by the arrangement of the movable support element at a tubular shaft that the curvature between the frame sections is continued within the area of the support installation and that the movable support element in its extended or operating position adjoins the fixed support element practically without gap.

These and other objects, features and advantages of the present invention will become more apparent from the following description when taken in connection with the accompanying drawing which shows, for purposes of illustration only, one embodiment in accordance with the present invention, and wherein.

Figure 1:
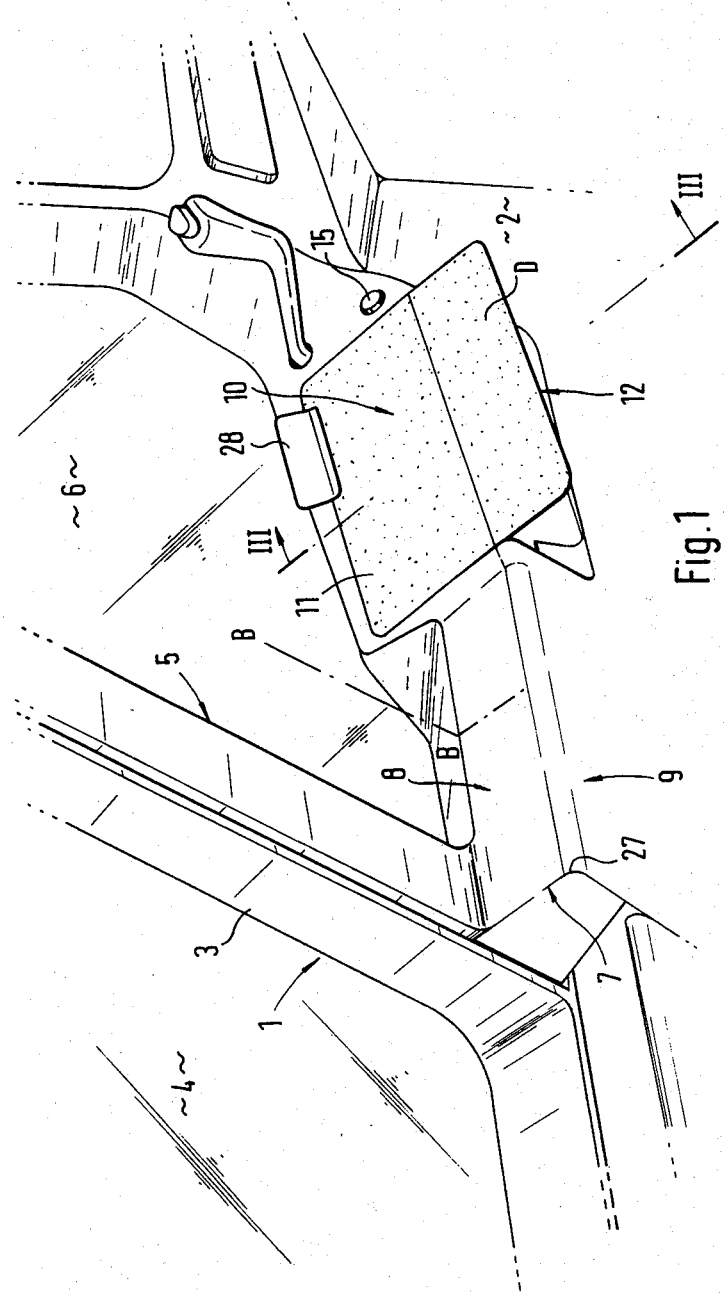
FIG. 1 is a perspective view of the lower portion of a covering frame of a sliding window with a support installation in accordance with the present invention.

Referring now to the drawing wherein like reference numerals are used throughout the various views to designate like parts, and more particularly to FIG. 1, a side wall generally designated by reference numeral 1 in an aircraft cockpit 2 includes a frame structure 3 and a windowpane 4. A sliding window generally designated by reference numeral 5 which is connected with the side wall 1 includes a clear vision window 6 and a covering frame 7. The covering frame 7 is formed by a first frame section 8 which extends generally perpendicularly to the window plane B-B. A second frame section 9 which adjoins the frame section 8 extends generally at a right angle to the first frame section 8.

Figure 2:
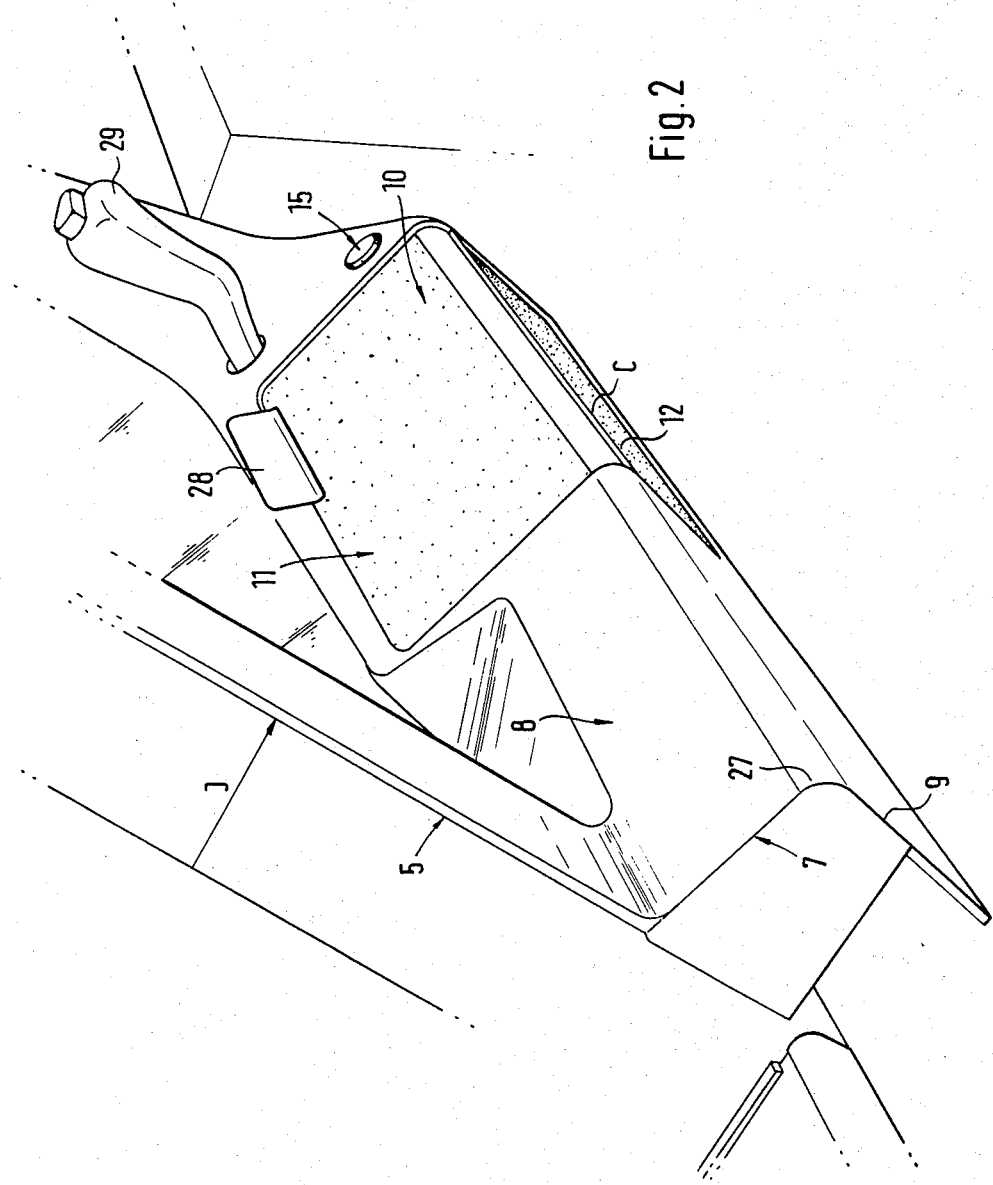
FIG. 2 is a perspective view, corresponding to FIG. 1, but taken from a different perspective.
Figure 3:
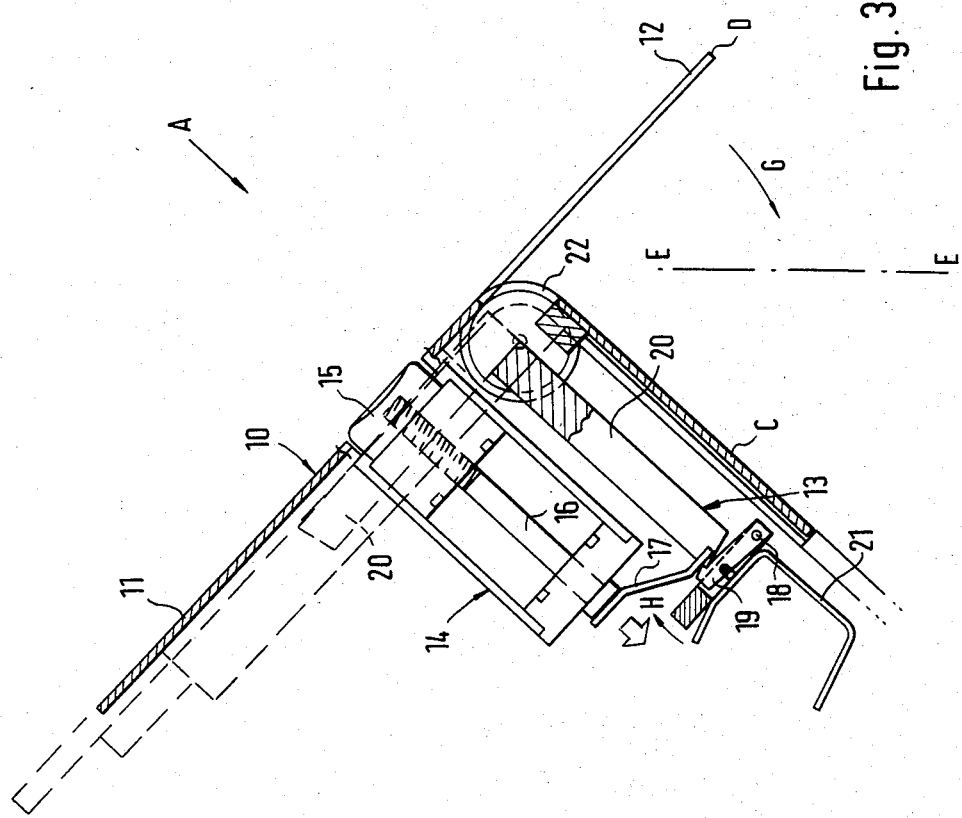
FIG. 3 is a cross-sectional view, on an enlarged scale, taken along line III—III of FIG. 1.

A support installation generally designated by reference numeral 10 which includes two support elements 11 and 12, is connected with the covering frame 7; both support elements 11 and 12 are formed by plate-shaped structural parts which ideally are adapted to be recessed in the frame sections 8 and 9. The support element 11 is securely connected with the frame section 8; in contrast thereto, the support element 12 is constructed to be movable and can be pivoted from a rest or stored position C (FIG. 2) abutting and recessed in the frame section 9, into an operating or extended position D (FIG. 1). In the operating or extended position D, the support element 12 represents an extension of the support element 11 and is retained in its position by means of a latching mechanism generally designated by reference numeral 13 (FIG. 3). The latching mechanism 13 moves along with the supported elements 11 and 12 and the covering frame 7 when the sliding window 5 is moved.

In order for the support element 12 to be retained in the rest or stored position C (see FIG. 3), which is disposed to one side of a theoretical vertical line E-E, a spring element (not shown) is provided which seeks to rotate the support element 12 in the direction of arrow G.

The latching mechanism 13 cooperates with an actuating member 14, which includes a push button 15 arranged recessed in the first frame section 8, an extension 16 and a transmission member 17.

The transmission member 17 cooperates with a latching hook 19 rotatably supported at 18 when the button 15 is depressed in the direction of arrow K. Latching hook 19 in turn cooperates with a support member 20 which is fixed generally perpendicularly relative to support element member 20 and, thus, support element 12 in the operating or extended position.

The latching hook 19 is secured on a fixed rail 21 which is fixed relative to the sidewall 1 and is biased in the direction H by means of a spring (not shown). The transmission member 17 acts opposite the effect of the spring during the actuation of the push button 15.

Figure 4:
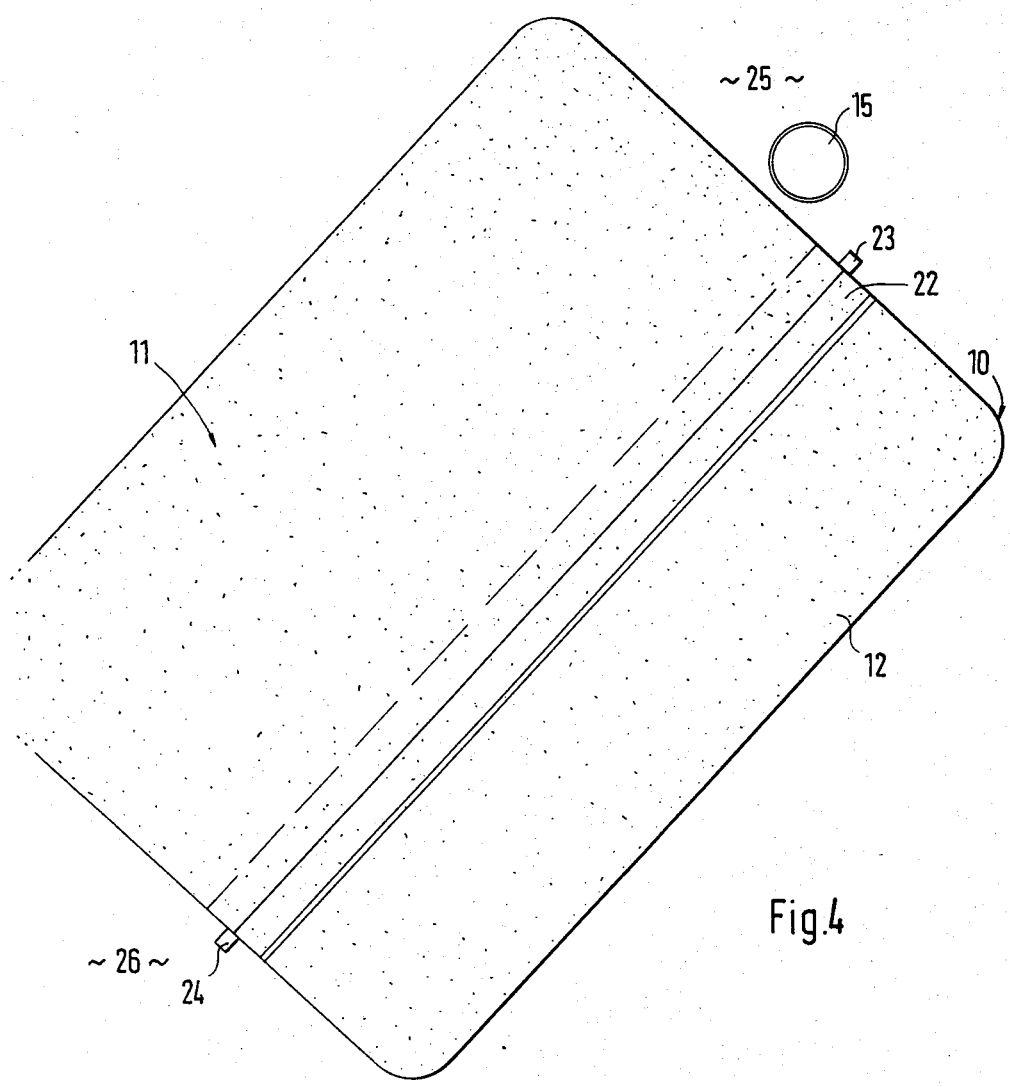
FIG. 4 is a plan view taken in the direction of arrow A of FIG. 3.

The support element 12 is secured to a tubular shaft 22 which is supported by means of pins 23 and 24 at the parts 25 and 26 of the covering frame 7 provided adjacent the support element 11 (FIG. 4).

The tubular shaft 22 forms the continuation of a curvature 27 between the frame sections 8 and 9, whereby the movable support element 12 and the fixed support element 11 are arranged tangentially to the tubular shaft 22 (FIG. 3). As a result thereof, not only the curvature 27 is continued practically uninterruptedly, but the support elements 11 and 12—in the operating or extended position D of the support element 12—are disposed adjacent one another without gap.

A retaining clamp is designated by reference numeral 28 (FIGS. 1 and 2), by means of which, for example, a flight map can be fixed relative to the support elements 11 and 12.

The support element 12 is brought manually into its operating position D against the force of the spring, as a result of which the support member 20 is engaged by and positioned by the latching hook 19. If the support element 12 is to be brought into its rest or recessed position C, the push button 15 is actuated, as a result of which the support element 12 pivots back automatically. If the sliding window 5 is opened by means of a handle 29, then the sliding window 5 is initially displaced in the direction J (FIG. 2). The support element 20 of the latching mechanism 13 follows this movement, as a result of which the support element 20 comes out of engagement with the latching hook 19 and the support element 12 then again is automatically returned to the rest or recessed position C.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A table-like support installation providing a substantially planar surface associated with a frame of a movable window, the movable window including a first frame section and a second frame section extending generally perpendicularly to said first frame section, the support installation comprising a plurality of support element means for forming a substantially planar surface, one of said support element means being fixedly mounted to the first frame section and a second of said support element means being movable from a rest position extending along the second frame section into an operating position forming an extension of the fixed first support element means, and latching means for locking said second support section in said operating position, said latching means being releasably manually and releasable by movement of said movable window thereby allowing said second support section to move from said operating position to said rest position.

2. A support installation according to claim 1, wherein the frame is a covering frame of a sliding window in an aircraft cockpit.

3. A support installation according to claim 1, wherein a spring means biases the movable support element towards the rest position.

4. A support installation according to claim 3, wherein an actuating member operable upon actuation thereof cooperates with the latching means to initiate the release and pivoting of the movable second of the support element means into the rest position.

5. A support installation according to claim 1, wherein the latching means includes a latching hook and a support member connected with the movable second of the support element means.

6. A support installation according to claim 5, wherein an actuating member is connected with the latching hook by way of a transmission element.

7. A support installation according to claim 6, wherein the actuating member includes a push button provided at the first frame section.

8. A support installation according to claim 7, wherein the push button is arranged recessed in the first frame section.

9. A support installation according to claim 7, wherein the movable second of the support element means is secured to a rotatable tubular shaft means.

10. A support installation according to claim 9 wherein the movable second of the support element means, in the operating position, and the fixed first of the support element means extend substantially tangentially to the tubular shaft means.

11. A support installation according to claim 10, wherein the plurality of support element means is formed by plate-shaped parts which are adapted to be recessed in the respective first and second frame sections.

12. A support installation according to claim 1, wherein an actuating member operable upon actuation thereof cooperates with the latching means to initiate the release and pivoting of the movable second of the support element means into the rest position.

13. A support installation according to claim 12, wherein the latching means includes a latching hook and a support member connected with the movable second of the support element means.

14. A support installation according to claim 13, wherein an actuating member is connected with the latching hook by way of a transmission element.

15. A support installation according to claim 1, wherein the movable second of the support element means, in the operating position, and the fixed first of the support element means extend substantially tangentially to the tubular shaft means.

16. A support installation according to claim 15, characterized in that the movable support element in its operating position and the fixed support element extend substantially tangentially to the tubular shaft means.

17. A support installation according to claim 1, wherein the plurality of support element means is formed by plate-shaped parts which are adapted to be recessed in the respective first and second frame sections.

18. A support installation according to claim 17, wherein the frame is a covering frame of a sliding window in an aircraft cockpit.

* * * * *